United States Patent [19]
Knapp

[11] Patent Number: 5,218,356
[45] Date of Patent: Jun. 8, 1993

[54] WIRELESS INDOOR DATA RELAY SYSTEM

[76] Inventor: Guenther Knapp, 7 Briarwood Ave., Peabody, Mass. 01960

[21] Appl. No.: 708,433

[22] Filed: May 31, 1991

[51] Int. Cl.$^5$ .............................................. H04B 7/00
[52] U.S. Cl. .................................. 342/350; 359/118; 359/145
[58] Field of Search ................... 342/350; 359/118, 145

[56] References Cited

U.S. PATENT DOCUMENTS

| | | | |
|---|---|---|---|
| 4,727,600 | 2/1988 | Avakian | 455/601 |
| 4,809,359 | 2/1989 | Dockery | 359/145 |
| 4,916,460 | 4/1990 | Powell | 359/145 |
| 4,975,926 | 12/1990 | Knapp | 375/1 |
| 5,103,461 | 4/1992 | Tymes | 375/1 |

*Primary Examiner*—Theodore M. Blum

[57] ABSTRACT

This invention removes the requirement of cable interconnections to local area network (LAN) nodes with wireless optical relay stations suitable for high data rates. Relay sections are equipped with IR transmitters, receivers and narrow beam optics. Manual beam alignment during the LAN installation is aided by a visible light beam of equal beam width and direction. Rotational freedom of the optical antenna systems provide precise aiming. Structure couplers extend, by low-power RF coupling through nonmetallic wall and ceilings, the wireless data transmission from a single room to rooms and building floors. Shielding and wall gaskets of the structure couplers eliminate RF radiation penetration and leakage, and therefore prevent eavesdropping and jamming.

10 Claims, 5 Drawing Sheets

WIRELESS INDOOR DATA RELAY SYSTEM

FIELD OF INVENTION

The present invention relates in general to communication systems and is particularly directed to improve practicality and utility of wireless indoor communication between workstations or other devices by means of infrared and other electromagmagnetic radiation over a local area network (LAN) and additional communication channels.

DESCRIPTION OF PRIOR ART

U.S. Pat. No. 4,975,926 issued to G. Knapp on Dec. 4, 1990 describes a wireless, high data rate, indoor communication system. The system discussed uses IR transponders for in line-of-sight communication to workstations. The transponders perform signal amplification, processing and distribution. All transponders are interconnected by cables.

The problem remaining in the prior art is to provide an optical communication system which eliminates all cable connections and prevents signal blockage or severe attenuation by certain building structures, i.e. walls and ceilings, such blockage and attenuation is inherent to high electromagnetic carrier frequencies that are needed for accommodation of large modulation bandwidths.

SUMMARY OF INVENTION

The foregoing problem in the prior art is solved to a large extent with the present invention by providing a tether-free operation for the transponders and other data distributing devices. More specifically, transponders are interconnected by radio waves and IR light beams throughout a building. Parallel IR light beams are guided through unobstructed areas of ceilings, elevator shaft walls, staircase center spaces, skylight openings, etc. Multiple beams form network data links to and from transponders equipped with network data link relay sections. Structure couplers extend, by low power radio frequency (RF) coupling through non-metallic walls and ceilings, the wireless data transmission from a single room to rooms and building floors.

A preferred embodiment uses IR lightwaves within each room of a building which permits simpler and less expensive designs than microwave and millimeter-wave embodiments, and such design avoids regulatory restraints by governments. Relay sections are equipped with IR transmitters, receivers and narrow beam width antennas. Manual beam alignment during the LAN installation is aided by a visible light beam of equal beam width and direction. Rotational freedom of the antenna system provides precise aiming. Shielding and wall gaskets of the structure couplers eliminate RF radiation penetration and leakage and, therefore, prevent eavesdropping and jamming. No FCC user license is required because of the low RF transmitter power.

DETAILED DESCRIPTION OF THE PREFERRED EMBODIMENTS

Before describing in detail the particular improvements over U.S. Pat. No. 4,975,926 with the present invention, it should be understood that the present invention resides in a novel transponder to transponder light communication link for indoor networks above 1Mbps which employ conventional, electrical, RF, and optical communication circuits and components or techniques as explained in detail in U.S. Pat. No. 4,975,926. Accordingly, the structure, arrangement and operation of these known techniques, circuits and components have been illustrated here only in simplified drawings and block diagrams, however, specific details that are pertinent to the present invention are shown and explained in sufficient detail to be readily understandable to those skilled in the art.

Figure 1:
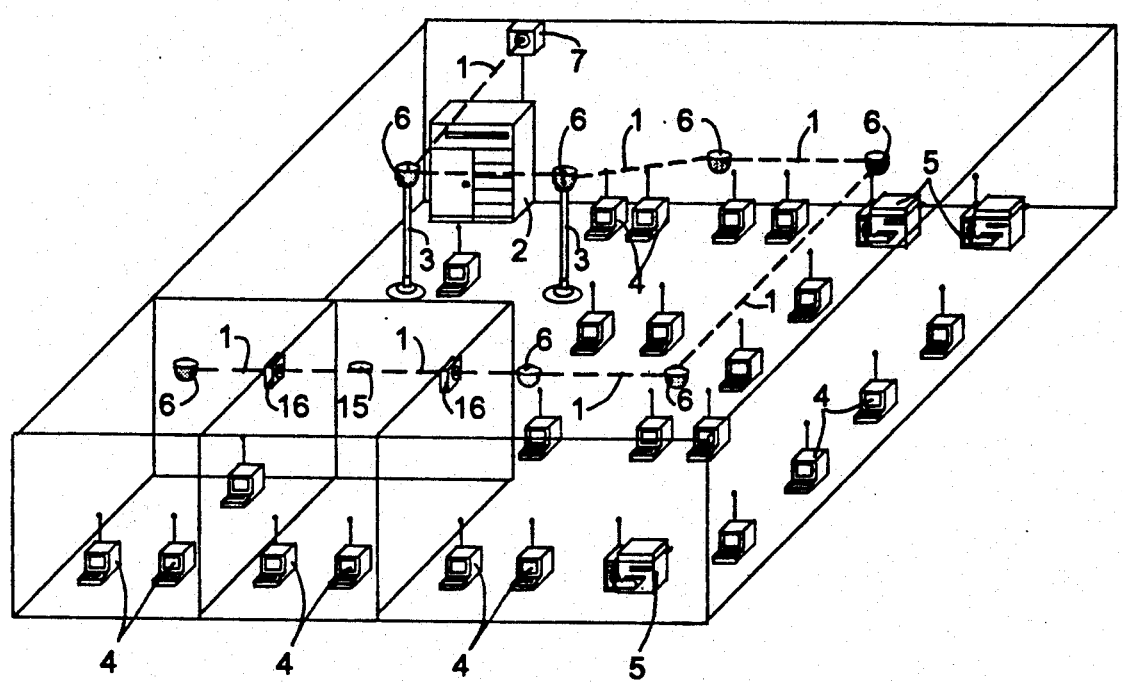
FIG. 1 is a typical office floor plan with transponder-attached relay station mounted to ceiling or attached to floor stands. The dashed line represents the invisible multibeam IR network data link.
Figure 2:
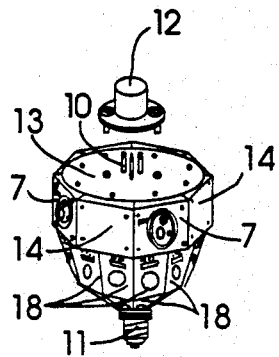
FIG. 2 is a transponder for attachment to a ceiling or a floor stand with protective cover for the unused a.c. power terminals or socket. Two IR network data relay sections are mounted for a 90 degree directional change of the IR beams.
Figure 4:
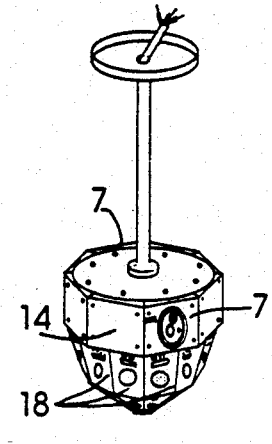
FIG. 4 is a hanging transponder for ceilings with line-of-sight obstructions.

In accordance with the present invention, the IR indoor transponder data relay system shown in FIG. 1 illustrates the preferred embodiment. For the demonstration of the concept an office floor plan with a small, three room LAN is shown. The inbound and outbound signal cables interconnecting the transponders of U.S. Pat. No. 4,975,926 are by this invention replaced with IR light beams 1. A computer 2 is serving the LAN, all workstations 4 and laser printers 5. A wall mounted relay section 7 translates the hard-wire signal connection from the computer 2 to an inbound and outbound data link by IR beams 1. Transponders 6, shown also in FIG. 2, are equipped with two relay sections 7 containing two IR transmitter/receiver pairs. Each relay section 7, shown as FIG. 5, contains one receiver with antenna system 8 and one transmitter with antenna system 9. The transponder in FIG. 4 has a different mounting provision, which is designed for locations where obstruction by ceiling ducts or other objects would interrupt the light beams normally located directly under the ceiling. The transponder version of FIG. 2 is a plug-in unit with a.c. power connection by power connector 10 or Edison socket 11. The unused power connection is protected by cover 12. In FIG. 1 two transponders 6 are attached with their Edison sockets to two floor stands 3, while the remaining transponders 6 are plugged into ceiling mounted a.c. power outlets. The preferred transponder embodiment has a mounting plate 13 carrying eight (8) upper sections forming an octagon. Typically, two blank section panels 14 are replaced with two relay sections 7. FIG. 2 depicts an effective 90 degree turn of the IR beams by mounting the second relay section 7 at the third mounting position from the first relay section 7. Common is the "straight through" configuration with two relay sections 7 separated by 180 degrees, as shown in FIG. 4. This relay configuration permits the removal of a transponder for maintenance, as shown in FIG. 1, with only the empty power outlet 15 left on the ceiling. Here, structure couplers 16 bridge the missing transponder with their IR beams 1. Service interruption will only occur in the center room and not in the adjacent rooms.

Figure 5:
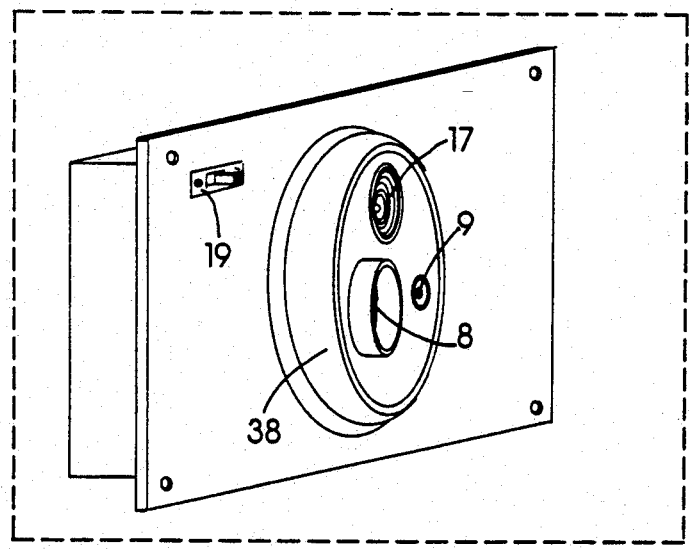
FIG. 5 is a detailed view of a relay section with a swivel eye for manual beam alignment.
Figure 6:
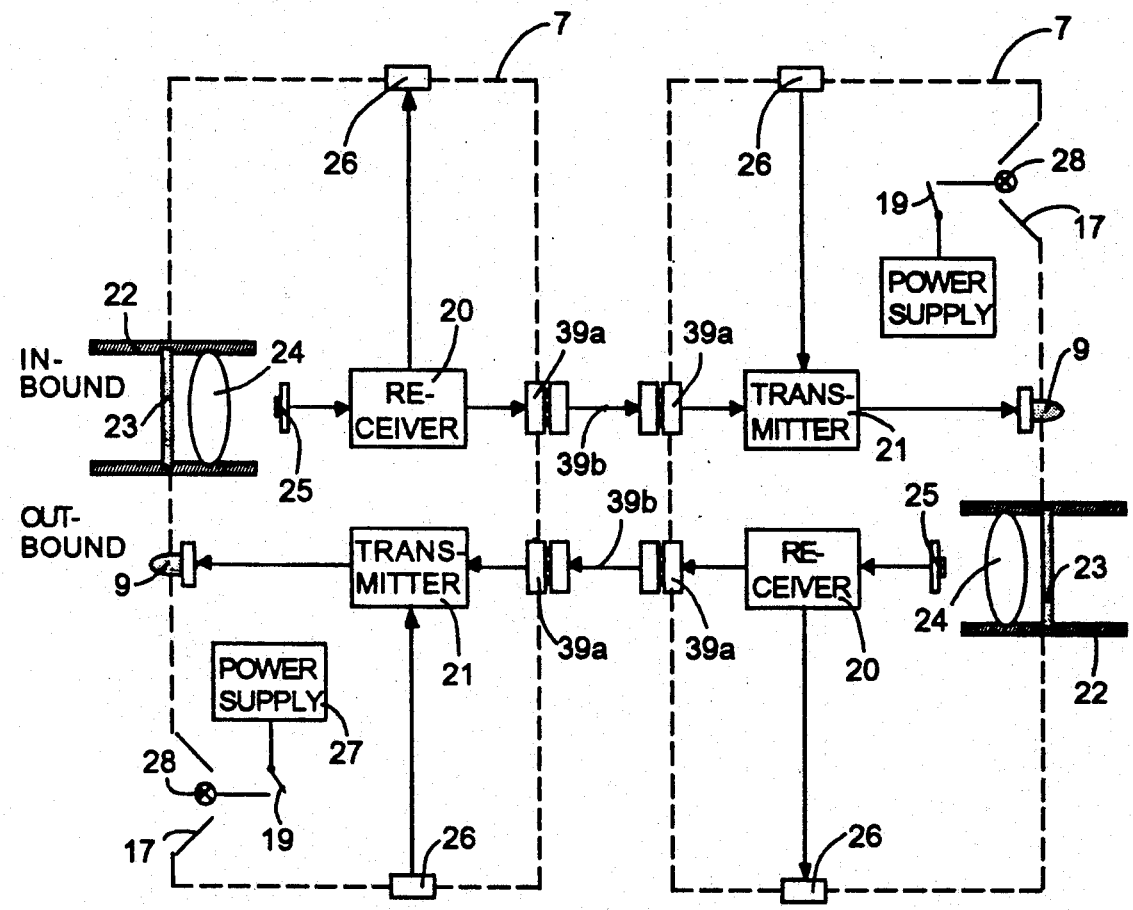
FIG. 6 is the block diagram of a pair of relay sections connected as a complete data relay station.

If transponders cannot be placed on ceilings or walls, floor stands 3 are used. Details of the relay sections are shown in FIGS. 5 and 6. A swivel eye assembly 38 contains the optical receiver system 8, the optical transmitter system 9 and the alignment light 28 with reflector 17. The optical receiver system 8 carries a light beam shielding tube 22 to reduce direct ambient light in contributing to the shot noise current which causes a significant reduction of the signal-to-noise ratio (SNR) and consequently is increasing the required $10^{-9}$ LAN bit error rate (BER).

The cylindrical shape of the tube 22 mainly avoids downlink transponder light beams and uplink workstation light beams to interfere with the relay station to relay station communicating beams. This is important in the preferred embodiment since all IR emitters are operating at wavelengths in the 900 nm region to avoid increasing costs if different frequencies for the communication channels are to be used.

For the preferred embodiment the cylindrical tube 22 (not a hood, see FIGS. 5, 6 and 8) extends beyond the 1.5 cm lens to 6 cm in length, four times the lens diameter and aperture. It should be noticed that, by taking advantage of the non-imaging character of the optical system, the area of light beam susceptibility for the photodetector is reduced by a factor of approximately 8 $n^2 = 128$, with n the ratio of the length of tube 22 in front of lens 24 to the aperture diameter of the tube 22 in front of lens 24. The extended part of tube 22 also serves as mount for the IR filter 23, and the non-extended part serves as mount for acrylic lens 24 and photodetector 25. The transmitter system 9 contains a light emitting diode (LED) with lens for transmission of a narrow modulated IR light beam to the next relay section 7. The swivel eye assembly 38 provides ±23 degrees of freedom in any forward direction for alignment of the IR beams 1 to the adjacent transponder 6 or structure coupler pair 16. Alignment is aided by the alignment spot light 17 in projecting a visible light spot equivalent to the beam pattern of emitter assembly 9. On-off control for the spot light bulb 28 is provided by switch 19.

Downlink transponder sections 18 provide inbound and outbound communication by IR light beams to the workstations on the floor. It should be noted that the light beams 18 are slanted toward the floor preventing multiple detections by the relay station photodetectors. Details of 18 are in U.S. Pat. No. 4,975,926.

FIG. 6 is the block diagram of the optical relay station. Two relay sections 7 are interconnected by interface connectors 39a and cables 39b, as shown. The top portion of FIG. 6 shows the serially connected receiver and transmitter systems carrying the inbound signal and the lower the lower portion of FIG. 6 shows the serially connected transmitter and receiver systems carrying the outbound LAN signal. In both relay sections 7, the receivers and transmitters carry multiconductor terminals 26 for connection to the interface controller of the down- and uplink transponder beams. Therefore, terminals 26 permit connections to the inbound and outbound paths of the transmitters and receivers, while providing flexibility for various networking protocols by gating the data flow (backup path or loopback with devices such as the Burr-Brown Wideband Switched-Input Operational Amplifier OPA 678) and preventing data collision of simultaneous inputs at the receiver or the transmitter modulator inputs.

Figure 7:
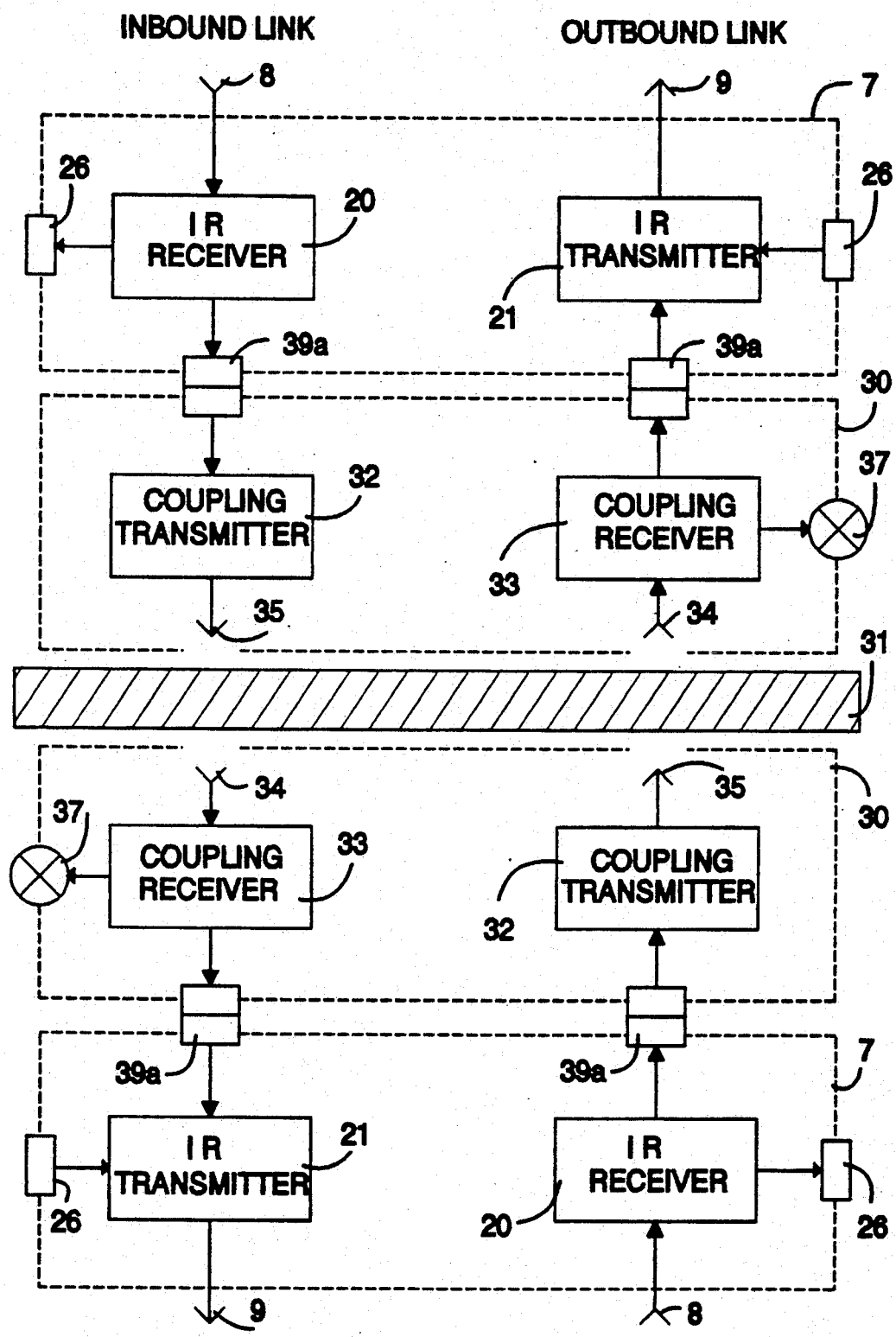
FIG. 7 is the block diagram of two structure couplers with a room dividing wall shown in center.
Figure 8:
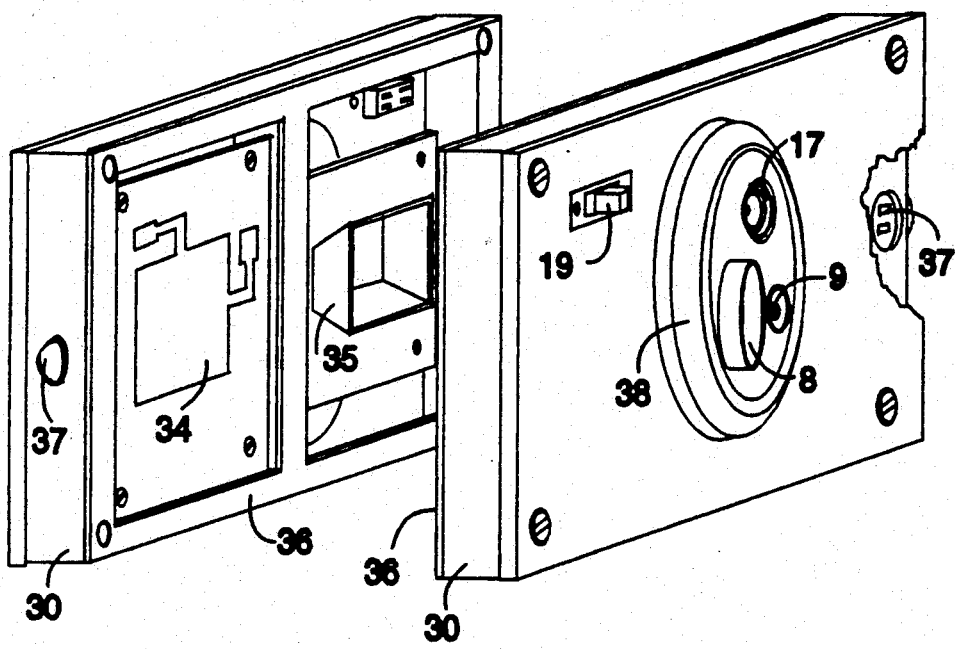
FIG. 8 is a pair of structure couplers with exposed radio antennas for communication through a wall.

A pair of relay sections 7, as shown in FIG. 6, may be used for guiding the signals around obstructions by two cables 39b or by placing the cables through holes in walls or ceilings. In many cases this may not be possible or desireable. As part of this invention the cables 39b, normally located between the relay sections 7, are removed and replaced with two radio couplers 30, as shown in FIG. 7 and FIG. 8. The radio couplers 30 are separated by the width of the wall 31, ceiling or other structure. Each coupler contains a coupling transmitter 32 with carrier generator, modulator and other commonly used circuits for retransmission of the inbound or outbound signals present at the IR receiver 20 output, which are the recovered and amplified signals from the antenna systems 8. The coupling receiver 33 of each radio coupler 30 receives the RF transmission from the coupling transmitter 32 of the inbound or outbound link and is located on the opposite side of the wall. The coupling receivers 33 amplify, demodulate the RF signals and recover the digital data by any of the well known radio communication circuits from the RF signal originally transmitted by transmitters 32 on the opposite side of the structure (wall 31). In the preferred embodiment the recovered data is retransmitted with IR from the relay sections 7 via interface connectors 39a.

Figure 3:
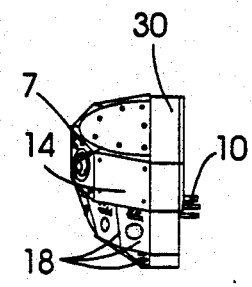
FIG. 3 is a transponder for placement on a wall. A structure coupler is mounted behind the transponder sections and is in contact with the wall for pick up of RF signals from the opposite side of the wall.

The coupling receiver antennas 34 and coupling transmitter antennas 35 may be designed in many configurations and are highly frequency dependent. In the preferred embodiment, as shown in FIG. 8, a transmitting horn antenna and a microstrip patch receiving antenna are placed directly to the dividing wall for maximum RF coupling. The receiver antenna 34 is dual-polarized to reduce losses caused by reflections in the wall structure and has a large aperture for capture of RF wall scatterings. For penetration of the structure, and to minimize RF leakage to the outside, a high-grain, small aperture transmitter antenna 35 is used. The radio coupler 30 is tightly RF radiation sealed and has RF wall gaskets 36 between the wall (wall not shown in FIG. 8) and the coupler housing for prevention of RF leakage. To minimize residual RF wall emissions by scattering. The wall transponder in FIG. 3 is combined with a radio coupler 30. Two wall transponders of this type, mounted on opposite sides of a wall, provide wireless room to room LAN inbound/outbound connections and provide broadcast transmissions to workstations on both sides of a dividing wall in the preferred embodiment an incandescent light 37 indicates by increasing in brightness the relative RF carrier strength of the RF transmitter power received from the opposite side of the wall or ceiling by a coupling receiver 33 at the closest position of both radio couplers 30, obtaining the highest signal-to-noise ratio for the LAN signals and consequently the lowest RF radiation to the outside. The location aid with a signalling light 37 can be improved by the use of an analog-to-digital converter combined with a sample-and-hold circuit and a numerical display to indicate a larger detected RF power range than the range of brightness an incandescent lamp can provide.

It is to be understood that the above-described embodiments are simply illustrative of the principles of the invention. Various other modifications and changes may be made by those skilled in the art which will embody the principles of the invention and fall within the spirit and scope thereof. For example, as shown in FIG. 3, the wall transponder equipped with downlink transponder sections 18 for IR wireless broadcast to workstations and equipped with a structure coupler 30, can be modified by replacement of all downlink transponder sections with one omnidirectional RF antenna as a means for downlink transmission to workstations with RF instead of IR, thereby, avoiding the need for higher RF transmitter power on the opposite side of the wall or ceiling.

What is claimed is:

1. A portable indoor wireless optical communication relay system to relay local area network (LAN) inbound and outbound data of at least 1 Mbps from optical relay stations to optical relay stations by means of narrow light beams serving a plurality of infrared (IR) transponders by a plurality of relay station, each relay station comprising:

at least two optical receiver systems for receiving modulated light signals, wherein one said receiver system is receiving said signals representative of the inbound data, and wherein one said receiver system is receiving said signals representative of the outbound data;

each said optical receiver system comprising: a light collecting means with tubular incidental light beam shielding means for protection of photo detecting means from direct and indirect, light rays of room illuminating sources and for protection from interfering data modulated light beams, a photo detecting means responsive to the light signals received from said light collecting means, and receiving means for data recovery and reconditioning of said modulated light signals;

at least two optical transmitter systems for transmitting said light modulated signals, wherein one said transmitter system is transmitting signals representative of the received and reconditioned inbound data, and wherein one said transmitter system is transmitting signals representative of the received and reconditioned outbound data;

each said optical transmitter system comprising: light beam emitting means with narrow beam width to illuminate the receiver light collecting aperture of the recipient relay station, transmitting means for driving said light beam emitter with amplified signals representative of the inbound or outbound signals;

an interface means for connection of received inbound to transmitted inbound data and received outbound to transmitted outbound data signal lines of two equally constructed optical relay sections forming an optical relay station, each said relay section comprising at least one said optical receiver system and at least one optical transmitter system.

2. An indoor wireless relay system according to claim 1 wherein the said tubular incidental light beam shielding means is a cylindrical tube extending at least one aperture diameter in length beyond the said aperture of the said light collecting means with the same diameter, and an optical filter to block the undesirable frequencies from other beams and incidental light frequencies.

3. An indoor wireless communication relay system according to claim 2 wherein coarse aiming means are supporting at least one said receiver system and at least one said transmitter system to aim said narrow light beams parallel and in orthogonally projection from at least two of m polygonally mounted surfaces.

4. An indoor wireless communication relay system according to claim 3 wherein said coarse aiming means include visible spotlight guided fine aiming means for directional control of the said narrow light beams by angles of at least 360°/m projecting light patterns of approximately equal or smaller dimensions to that of the said narrow light beams.

5. An indoor wireless communication relay system according to claim 1 wherein inbound data and outbound data are modulated on light of different frequencies.

6. An indoor wireless communication relay system according to claim 1 wherein each said optical transmitter and each said optical receiver is connected by a terminal means to the LAN interface controller thereby providing separate data signal connections from the said interface controller to and from said optical transmitter and said optical receiver.

7. An indoor wireless communication relay system according to claim 1 wherein a LAN interface controller is included with the said communication relay system to establish network connection and network protocol adaptation with an IR transponder or other light modulated data distributing means constructed without a LAN interface controller.

8. An indoor wireless signal coupling relay system wherein connectivity for inbound and outbound signals are maintained through a wall or ceiling by confined electromagnetic radiation, comprising:

an inbound coupling RF transmitting antenna means placed directly on said wall or ceiling for directed transmission if inbound signals to the inbound coupling RF receiver antenna located on its opposite side of said wall or ceiling, an inbound coupling RF transmitter for operation of said inbound coupling RF transmitter antenna, including: an RF carrier generating means interfacing with said inbound coupling RF transmitter antenna, modulating means for modulation of an inbound RF carrier with inbound signals which are obtained from the inbound receiving means;

outbound coupling RF receiving antenna means which is placed directly on said wall or ceiling for reception of outbound signal modulated RF carrier transmissions from the opposite side of said wall or ceiling which are transmitted by the outbound coupling RF transmitter antenna;

an outbound coupling RF receiver for receiving outbound signal modulated RF from an outbound coupling RF receiver antenna, including: low noise amplifying means for low level RF amplification, demodulating means for demodulation of received said outbound signal modulated RF, and recovery means for recovery of said outbound signals;

an interface means to provide connection of signals received from an inbound signal source to said inbound coupling RF transmitter modulating means; and said interface means to provide connection of output signals of said outbound coupling RF receiver recovery means to an outbound signal receiver;

an outbound coupling RF transmitter antenna placed directly on said wall or ceiling for direct transmission of outbound signal modulated RF to the outbound coupling RF receiver antenna located on its opposite side of said wall or ceiling, an outbound coupling RF transmitter for operation of said outbound coupling RF transmitter antenna, including: RF carrier generating means interfacing with said outbound coupling RF transmitter antenna, modulating means for modulation of an outbound RF carrier with signals which are obtained from an outbound lightwave receiving means, an inbound RF receiver antenna which is placed on said wall or ceiling for reception of said inbound signal modulated RF carrier transmissions from opposite side of said wall or ceiling which are transmitted by the said inbound coupling RF transmitter antenna;

inbound coupling RF receiving antenna means which is placed directly on said wall or ceiling for reception of inbound signal modulated RF carrier transmissions from the opposite side of said wall or ceiling which are transmitted by the inbound RF transmitter antenna;

an inbound coupling RF receiver for receiving of said inbound signal modulated RF from said inbound coupling RF receiver antenna including: low noise amplifying means for low level RF amplification, demodulating means for demodulation of received said inbound data signal modulated RF, and recovering means for recovery of said inbound signals;

an interface means to provide connection of signals received from an outbound signal source to said outbound coupling RF transmitter modulating means; and said interface means to provide connection of output signals of said inbound coupling RF receiver recovery means to an inbound signal receiver;

RF shielding housing means to enclose and shield one coupling RF transmitter antenna, one coupling RF transmitter, one coupling RF receiver antenna and one RF receiver together for placement on one side of said wall or ceiling with its one-sided openings facing the said wall or ceiling for passage of RF radiation;

RF shielding gasket means tightly fitting between said housing means and said wall or ceiling, and said gasket means extending outside of said housing means on the said wall or ceiling to enhance confinement of RF radiation.

9. An indoor wireless signal coupling relay system according to claim 8 wherein the RF carrier power received by one RF inbound receiver antenna is measured and indicated by a signalling system, and the RF carrier power received by one outbound coupling RF receiver antenna is measured and indicated by a signalling system, each signalling system comprising:

threshold means for measurement of the detected RF carrier power to establish the best coupling location of the RF receiving antenna with respect to the RF transmitter antenna on the opposite side of said wall or ceiling by signalling the relative RF carrier power levels received to the signalling means;

signalling means for indication of RF carrier power level detected by the said threshold means indicating the highest RF carrier power level at a location for the placement of the signal coupling relay system on said wall or ceiling.

10. An indoor wireless signal coupling relay system according to claim 8, wherein:

the interface means of the said inbound coupling RF receiver and of the said outbound coupling RF transmitter is connecting the terminal of one optical relay section collocated on one side of said wall or ceiling with said optical relay section; and the interface means of the said outbound coupling RF receiver and of the said inbound coupling RF transmitter is connecting the terminal of the other optical relay station collocated on the other side of said wall or ceiling thereby establishing a data modulated lightwave to data modulated lightwave connectivity through said wall or ceiling.

* * * * *